United States Patent [19]

Kamaya

[11] Patent Number: 4,747,528

[45] Date of Patent: May 31, 1988

[54] ANTI-THEFT ROOF CARRIER STRUCTURE FOR AN AUTOMOBILE

[75] Inventor: Masashi Kamaya, Tokyo, Japan

[73] Assignee: PIAA Corporation, Tokyo, Japan

[21] Appl. No.: 876,463

[22] Filed: Jun. 20, 1986

[51] Int. Cl.$^4$ ............................................... B60R 9/00
[52] U.S. Cl. .................................. 224/315; 224/322; 224/329; 70/231
[58] Field of Search ............... 224/320, 322, 329, 315, 224/309; 70/231

[56] References Cited

U.S. PATENT DOCUMENTS

| | | | |
|---|---|---|---|
| 3,796,074 | 4/1974 | Vik | 70/231 |
| 4,441,344 | 4/1984 | Kurpershoek | 70/231 |
| 4,586,638 | 5/1986 | Prescott et al. | 224/322 X |

Primary Examiner—Henry J. Recla
Assistant Examiner—David Voorhees
Attorney, Agent, or Firm—Oblon, Fisher, Spivak, McClelland & Maier

[57] ABSTRACT

A lock unit of a roof carrier of a vehicle which includes a crossbar for placing an object to be carried thereon, a plurality of stands for supporting the crossbar on a vehicle roof, and a rotatable knob mounted on at least one of the stands, for fixing the stands at given positions, on the roof of the vehicle, wherein the knobs include a lock member for preventing rotation of the knobs, the locking member including a cam member, and wherein the knob includes a bottom plate, a rotating member mounted on the plate, a pin member, and a biasing member positioned between the rotating member and the cam member for biasing the pin member into engagement with the cam member.

2 Claims, 2 Drawing Sheets

ANTI-THEFT ROOF CARRIER STRUCTURE FOR AN AUTOMOBILE

BACKGROUND OF THE INVENTION

1. Field of the Invention

The present invention relates to a roof carrier of a vehicle, and is provided for preventing theft of the roof carrier.

2. Description of the Prior Art

Along with the trends of motorization, a roof carrier has become an indispensable accessory for a vehicle. Esthetic roof carriers are popular, and tend to be expensive. However, although the roof carrier must be easily removable from the vehicle for user convenience, such roof carrier is likely to be stolen.

SUMMARY OF THE INVENTION

The present invention is characterized by comprising a roof carrier with a lock member, which cannot be easily stolen, while still being easily mounted/removed. More specifically, the roof carrier of the present invention comprises a crossbar for placing and fixing an object to be carried, and a plurality of stands, for supporting the crossbar, which are capable of being placed and fixed on the roof of a vehicle. Conventionally, in order to mount stands at given positions on a vehicle, bolts attached to the stands are rotated, thereby fixing and supporting the stands on the vehicle. According to the present invention, a rotating-type knob is provided in place of a bolt, and a lock member is provided in the knob for preventing rotation thereof. With this arrangement, only a person with a key can unlock the lock member, thereby preventing robbery of the roof carrier.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

An embodiment of the present invention will be described in detail with reference to the accompanying drawings.

Figure 1:
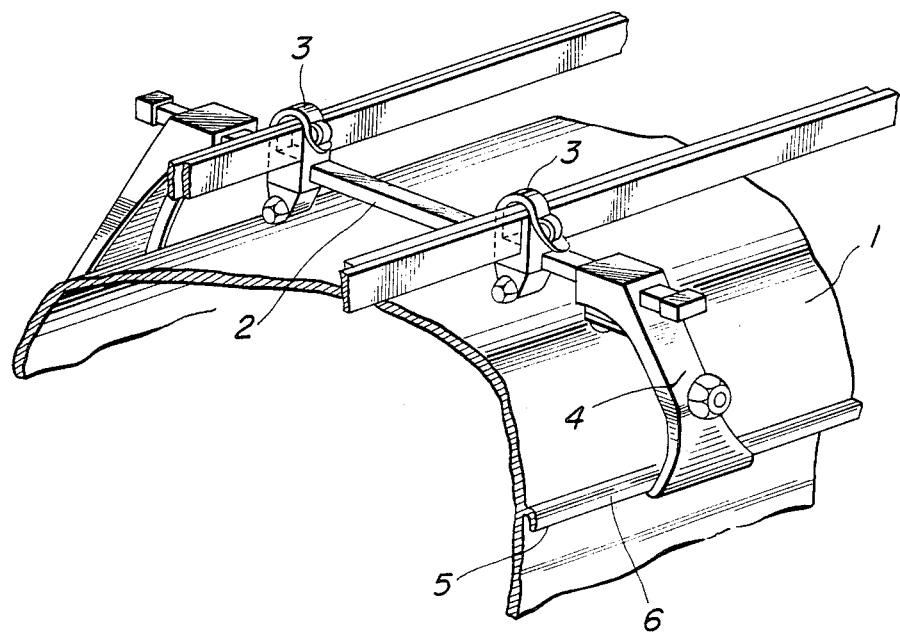
FIG. 1 is a view showing an overall mounting state of a roof carrier.

FIG. 1 is a view showing a roof carrier mounted on a vehicle roof, i.e., in the using state of a roof carrier. Reference numeral 1 denotes a vehicle roof; and 2, a crossbar provided along the lateral direction of the vehicle roof 1. A plurality of retainers 3 for fixing an object to be carried, e.g., a pair of skis, are provided on the crossbar 2.

Side end portions of the crossbar 2 are respectively inserted in stands 4, thereby supporting the crossbar 2 on the vehicle roof 1. The lower end portion of each stand 4 is bent inward and upward so as to engage with a gutter 5 having a flange portion and which is provided on the upper side portion of the existing vehicle. Reference numeral 11 denotes a rotating-type knob. A bolt 12 of the knob 11 is screwed from outside at a given position of each stand 4, and the distal end of the bolt 12 is engaged with the side surface of the vehicle. Therefore, when the knob 11 is rotated, the flange portion 6 of the lower end portion of the stand 4 is firmly engaged with the gutter 5, so that the stand 4 and the like is securely attached to the vehicle.

Figure 2:
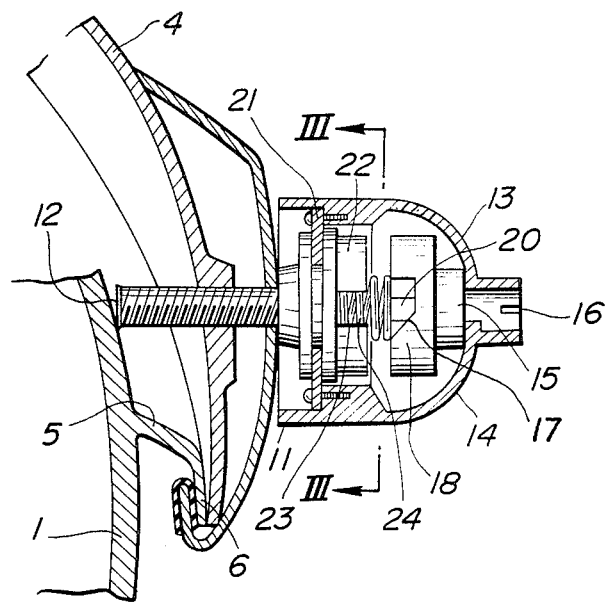
FIG. 2 is a sectional view showing a lock member.
Figure 3:
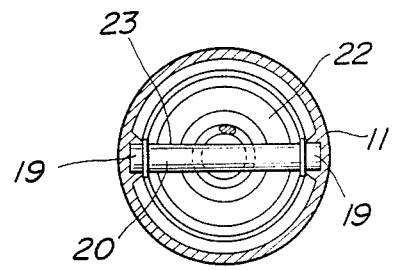
FIG. 3 is sectional view of the lock member, taken along line III—III of FIG. 2.

The knob 11 can have a lock member 13 of any type, as long as it prevents rotation of the bolt 12. FIGS. 2 and 3 show an example of the knob.

Reference numeral 14 denotes a horizontal plate-like knob main body. A lock 15 is provided on the central axis of the knob main body 14. The lock 15 has a key insertion hole 16 in a surface thereof at an outer end face of the knob main body 14. A cam member 18 having an angular cam 17 is fixed on the other end face of the lock 15 and has an axis of rotation.

A pair of guide grooves 19 are formed in inner opposing surfaces of the knob main body 14. The two ends of a pin 20 are slidably engaged with the guide grooves 19, and the pin 20 is abutted against the angular cam 17 and is positioned so as to be transverse to the axis of rotation of the angular cam 18. Reference numeral 21 denotes a bottom plate of the knob main body 14. One end of a rotating member 22 is rotatably supported at a central portion of the bottom plate 21. The bolt 12 projects outward from the rotating member 22. A recess 23 and a coil spring 24 are provided in the other end of the rotating member 22. When the pin 20 is actuated, the recess 23 is engaged with the pin 20 to transmit the rotating force of the knob main body 14 to the rotating member 22. The coil spring 24 constantly urges the pin 20 against the cam 17.

Assuming that the pin 20 is engaged with the recess 23 of the rotating member 22, i.e., that the pin 20 is at the top of the angular cam 17, when the knob main body 14 is rotated to engage with the stand 4 and is then further rotated, the bolt 12 is interlocked with the knob main body 14 so that the stand 4 can be fixed to the vehicle as described above. In this state, when a user inserts and rotates the key, the lock 15 is rotated, the cam member 18 is interlocked with the lock 15 and rotated, and the pin 20 is moved to the groove 19 in the cam member 18. As a result, the pin 20 is disengaged from the recess 23 of the rotating member 22. Therefore, even if the knob main body 14 is further rotated, its rotating force is not transmitted to the rotating member 22 and the bolt 12. This means that a person not using the unlocking element (key) of the lock 15 cannot be detached from the stand 4 fixed to the vehicle, thereby preventing theft of the roof carrier.

As described above, according to the present invention, while the roof carrier is of a type to be fixed to the vehicle with only bolts, it has a lock unit to prevent rotation of the bolts, once they are fixed. Therefore, only a person having the key to the lock unit can remove the roof carrier.

What is claimed is:

1. A lock unit of a roof carrier of a vehicle, comprising a crossbar for placing an object to be carried thereon, a plurality of stands mounted on said crossbar for supporting said crossbar on a vehicle roof, and a rotatable knob mounted on at least one of said stands, for fixing said stands at given positions on said roof of said vehicle, wherein said knob includes a locking member rotatably mounted with respect to said knob for preventing rotation of said knob, said locking member including a rotatable cam member having a camming surface and wherein said knob includes a bottom plate, a rotating member mounted on said plate and having at least one recess formed therein, a pin member movably mounted in said locking member transverse to a rotational axis of said cam member, and biasing means positioned between said rotating member and said cam member for biasing said pin member into engagement with said cam member; wherein said cam member is rotated to move said pin out of engagement with said recess, thereby preventing rotation of said knob and defining a locked state and wherein said cam member is rotated to move said pin into engagement with said recess defining an unlocked state.

2. A lock unit as set forth in claim 1, further comprising a bolt for interconnecting said knob and said stand.

* * * * *